Oct. 28, 1952 F. J. FOUST ET AL 2,615,327
APPARATUS FOR TESTING PRESSURE SWITCHES
Filed June 3, 1948 8 Sheets-Sheet 3

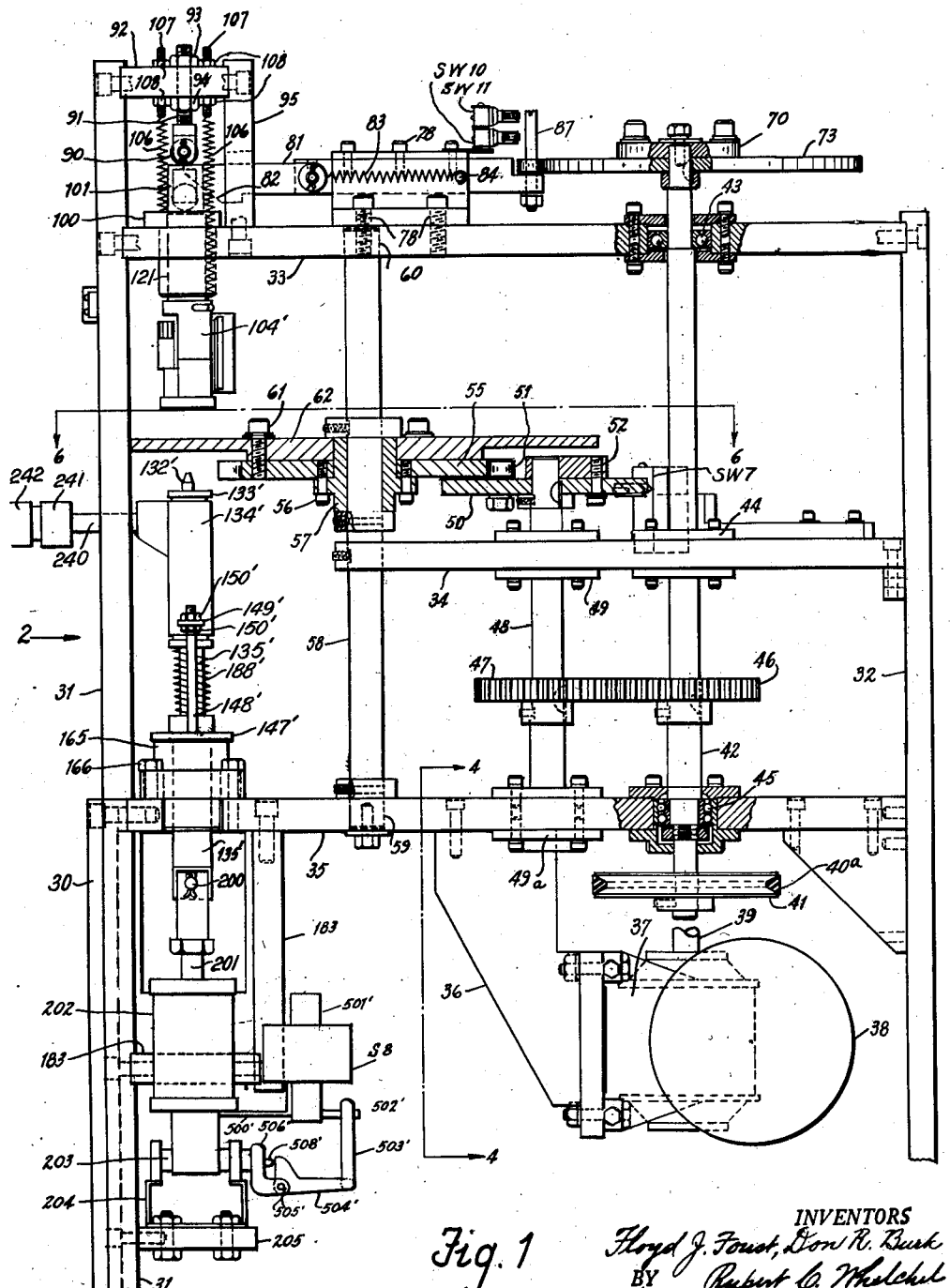

INVENTORS
Floyd J. Foust
Don R. Burk
Rupert C. Whelchel
by Spencer Hardman and Fehr
their attorneys Oct. 28, 1952 F. J. FOUST ET AL 2,615,327
APPARATUS FOR TESTING PRESSURE SWITCHES
Filed June 3, 1948 8 Sheets-Sheet 4

INVENTORS
Floyd J. Foust, Don R. Burk
BY Rupert C. Whitchel
Spencer Hardman and Fehr
their attorneys

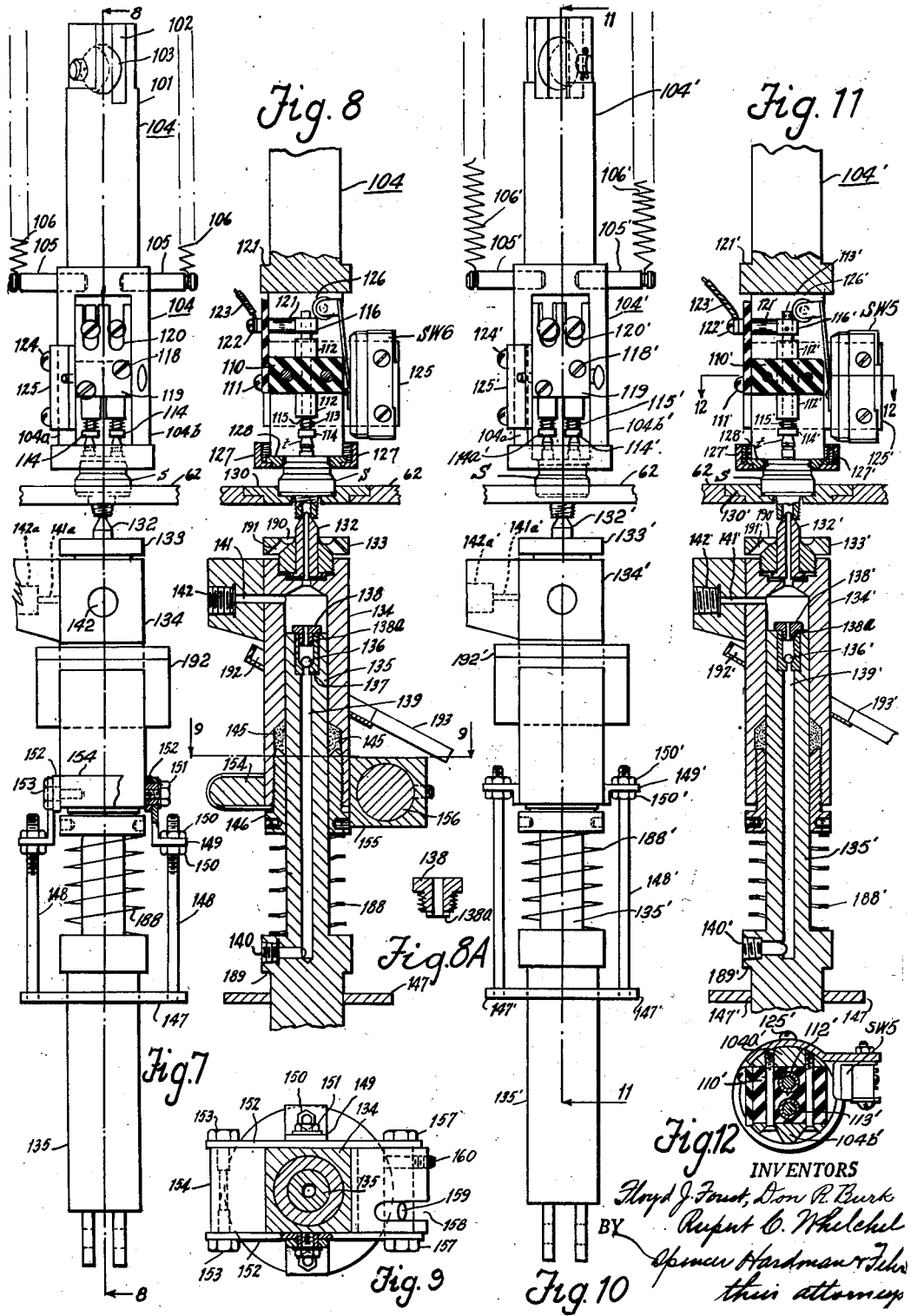

Oct. 28, 1952  F. J. FOUST ET AL  2,615,327
APPARATUS FOR TESTING PRESSURE SWITCHES
Filed June 3, 1948  8 Sheets-Sheet 6
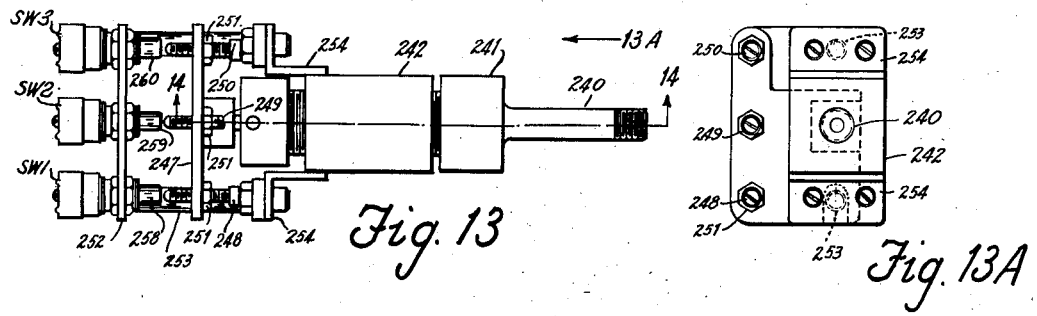
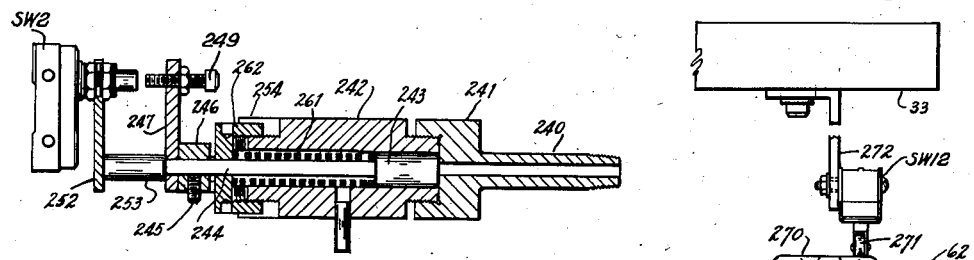
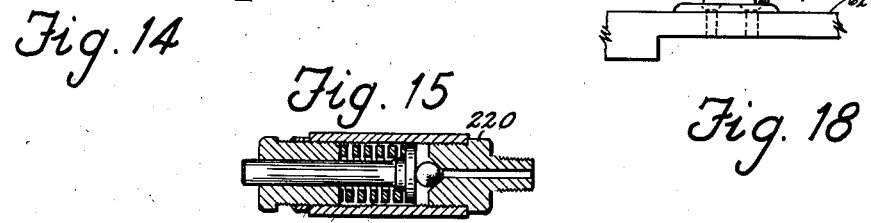
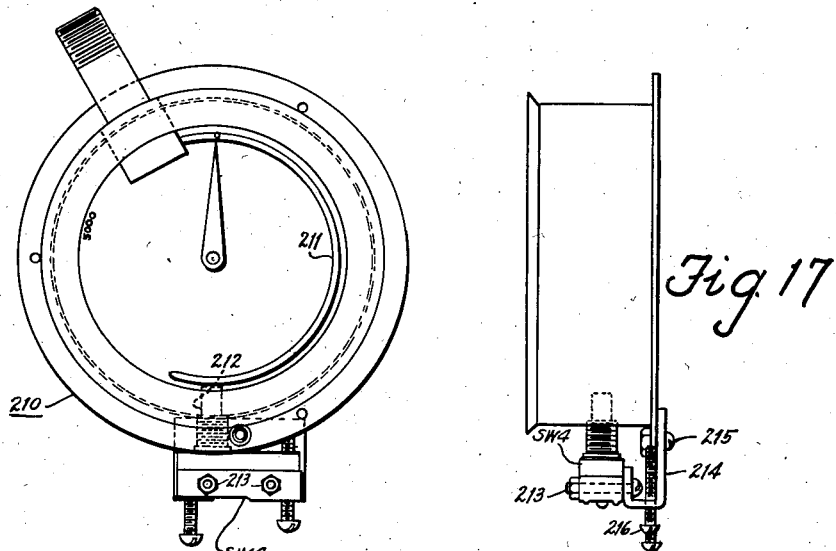
INVENTORS
Floyd J. Foust, Don R. Burk
Rupert C. Whitchel
BY Spencer Hardman & Fehr
their attorneys

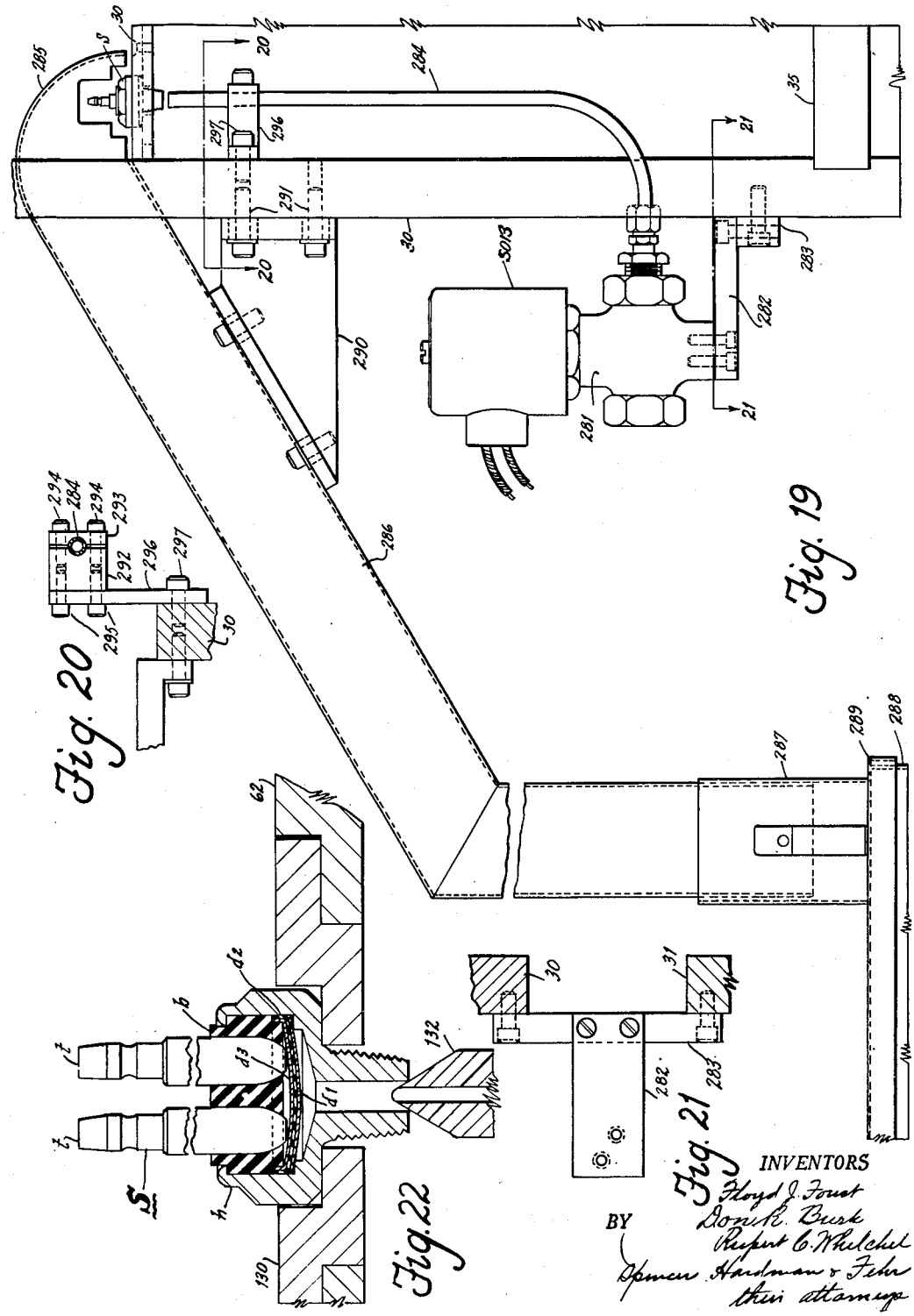

Patented Oct. 28, 1952

2,615,327

UNITED STATES PATENT OFFICE 2,615,327

APPARATUS FOR TESTING FLUID PRESSURE SWITCHES

Floyd J. Foust, Don Randall Burk, and Rupert C. Whelchel, Anderson, Ind., assignors to General Motors Corporation, Detroit, Mich., a corporation of Delaware Application June 3, 1948, Serial No. 30,945

8 Claims. (Cl. 73—4)

This invention relates to the manufacture of stop light switches which are used in hydraulic braking systems to complete an electric circuit to an indicator lamp when the braking pressure is applied through the system.

An object of the invention is the provision of a machine for automatically testing stop light switches. The machine comprises a conveyor having workholders for receiving stop light switches which are moved by the conveyor successively past a loading station and two test stations. At one test station, the switches are subjected to a high pressure to test for leaks and are subjected to an electrical circuit to test for ground. At the second station they are subjected to low pressure to determine within which one of a plurality of pressure ranges the fixed contacts of the switch are engaged by the pressure actuated movable contact of the switch.

Further objects and advantages of the present invention will be apparent from the following description, reference being had to the accompanying drawings wherein a preferred embodiment of the present invention is clearly shown.

In the drawings:

Fig. 1 is a side elevation of the test machine, certain parts being shown in section.

Fig. 7 is a front elevation of the high pressure test apparatus, this view being in the direction of arrow 7 of Fig. 5.

Fig. 8 is a sectional view on line 8—8 of Fig. 7.

Fig. 8A is an enlargement, in section, of part 138 of Fig. 8.

Fig. 9 is a sectional view on line 9—9 of Fig. 8.

Fig. 10 is a front elevation of the low pressure test apparatus, this view being in the direction of arrow 10 of Fig. 5.

Fig. 11 is a sectional view on line 11—11 of Fig. 10.

Fig. 12 is a sectional view on line 12—12 of Fig. 11.

Fig. 13 is a plan view of a device for controlling signal lamp actuating thyratrons according to the pressure required to close the switch under test.

Fig. 13A is a view in the direction of arrow 13A of Fig. 13.

Fig. 14 is a view, partly in section, on line 14—14 of Fig. 13.

Fig. 15 is a longitudinal sectional view of a pressure relief device.

Figs. 16 and 17 are front and side views of a pressure gauge whose pressure element operates a switch SW4.

Fig. 18 is a fragmentary view showing the support for a switch SW12 which is operated by cams mounted on the dial.

Fig. 19 is an elevation of a device for ejecting from the conveyor turn-table switches which leak.

Figs. 20 and 21 are sectional views on the lines 20—20 and 21—21 respectively of Fig. 19.

Fig. 22 is an enlarged sectional view of the switch which is tested and a workholder supporting it.

Figure 23:
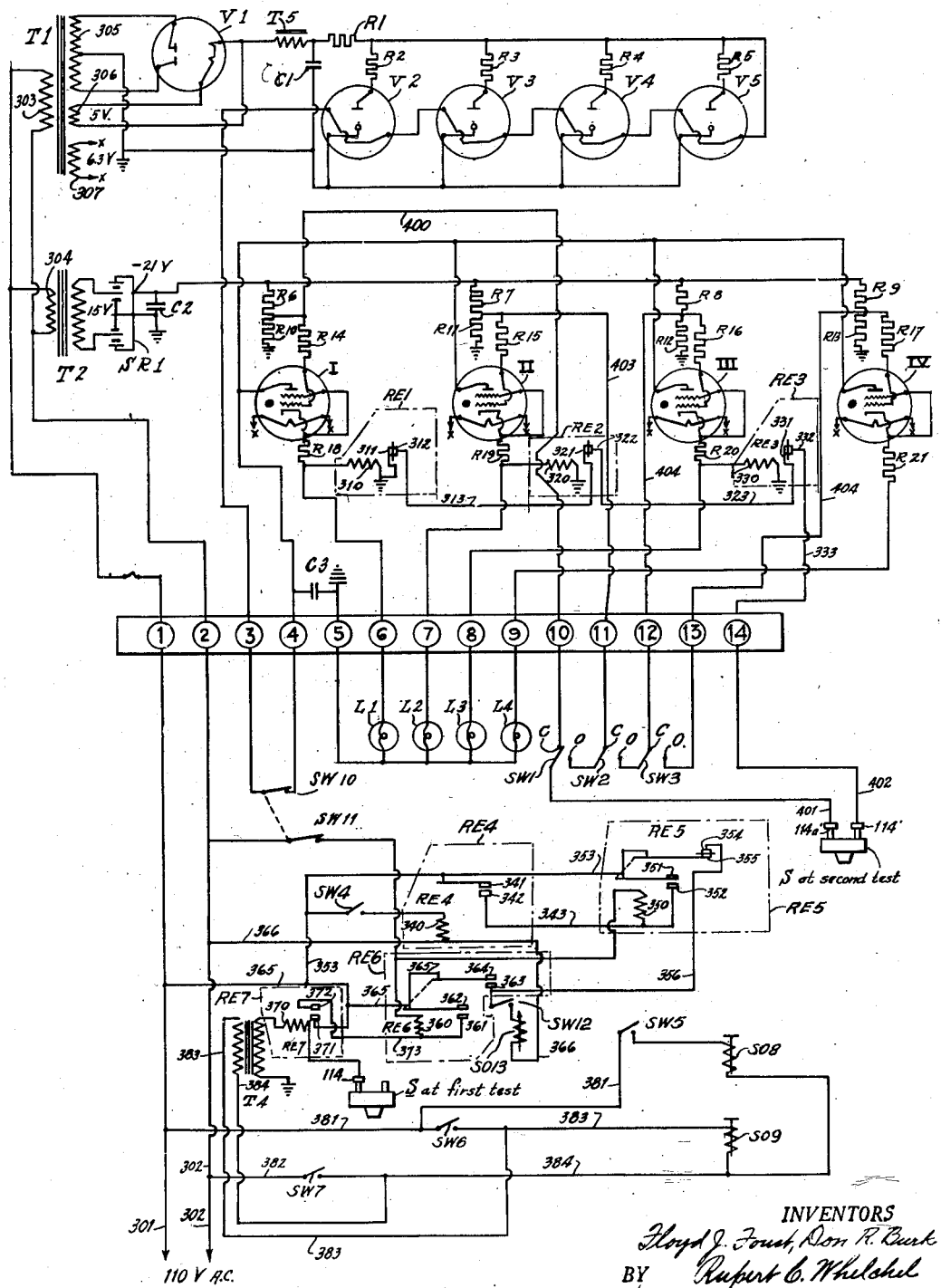

Fig. 23 is a wiring diagram of the electrical testing apparatus.

Figures 2, 3, 4:
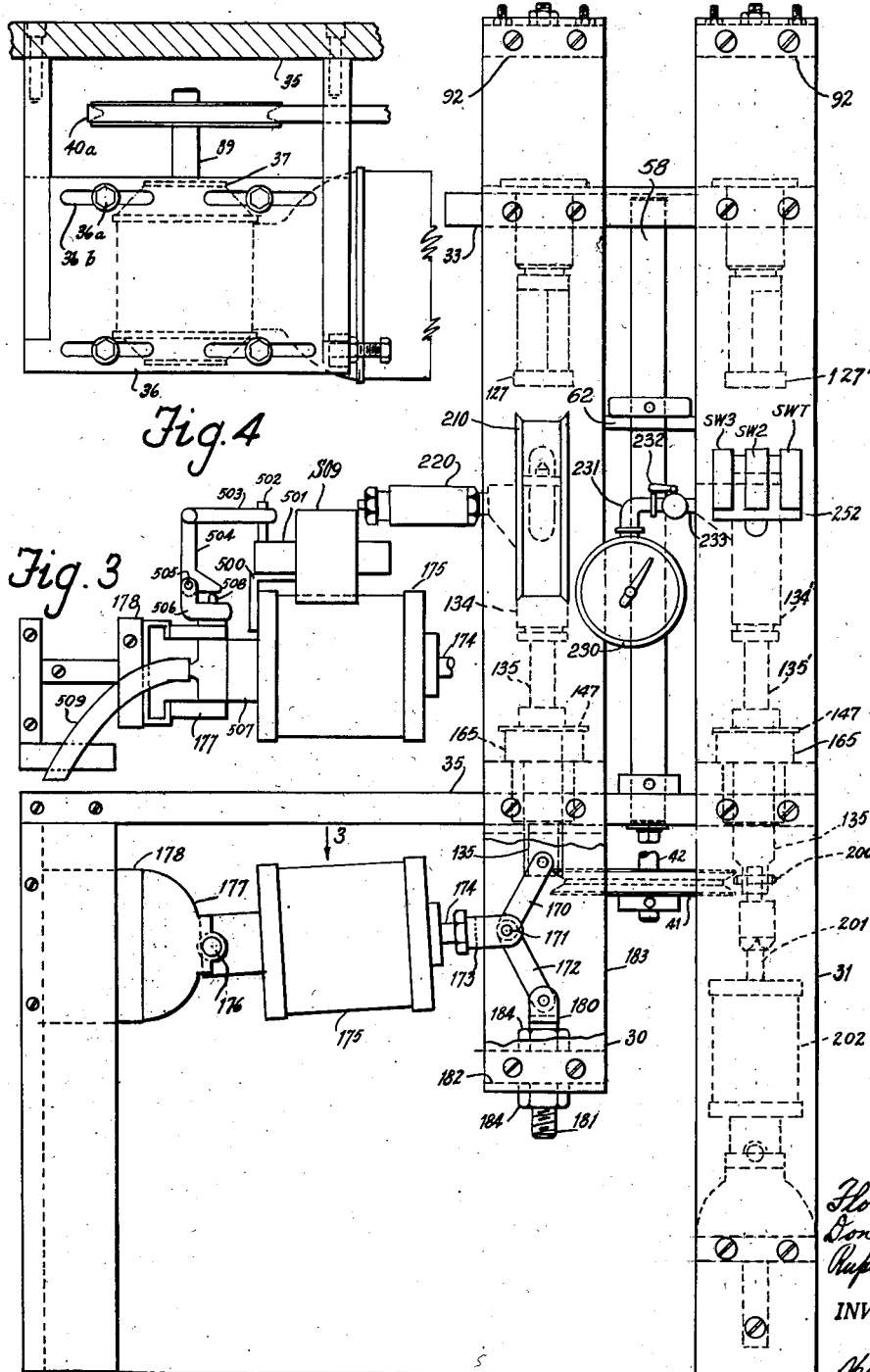
Fig. 2 is a view in the direction of arrow 2 of Fig. 1.
Fig. 3 is a view in the direction of arrow 3 of Fig. 2.
Fig. 4 is a view in the direction of arrow 4 of Fig. 1.
Figure 6:
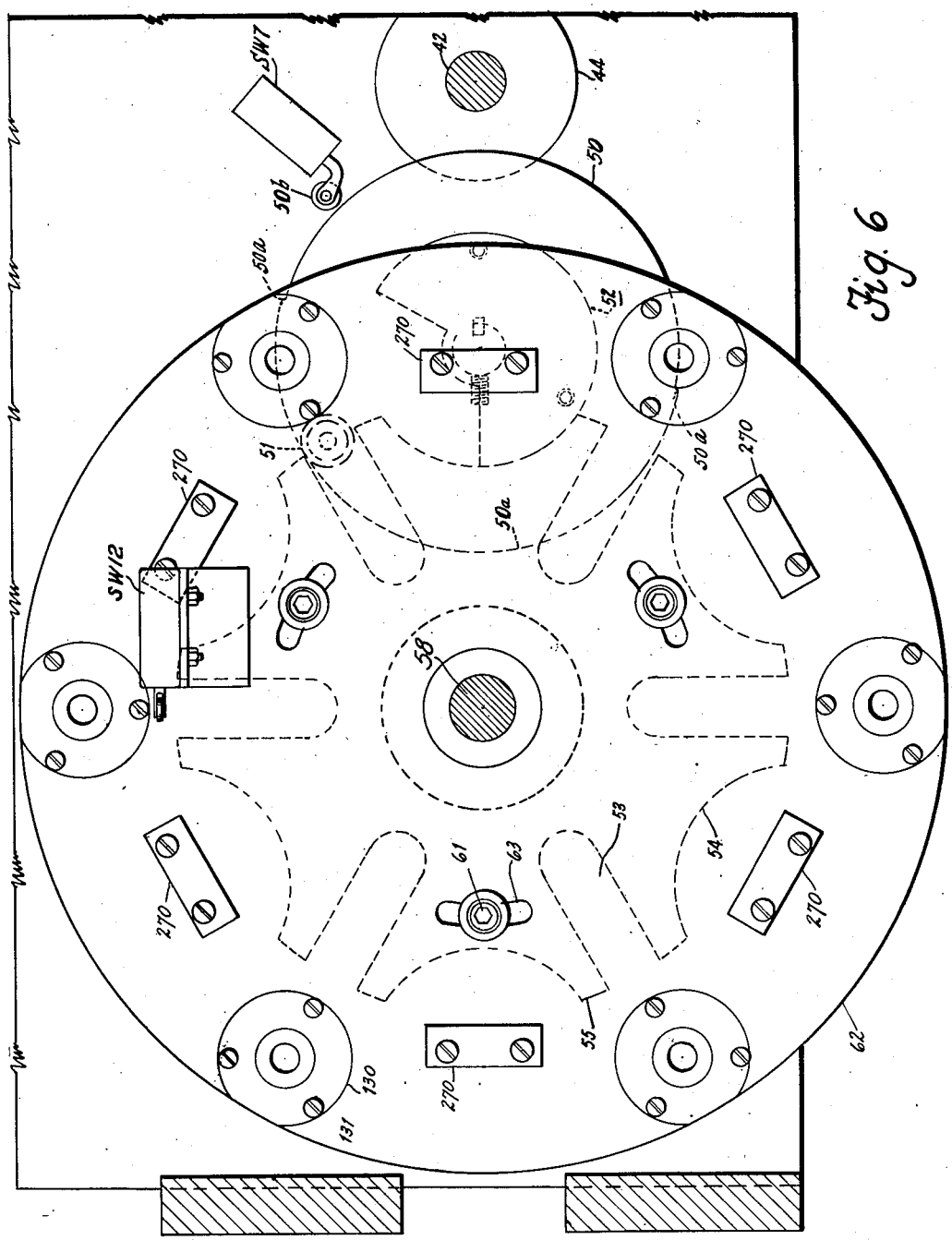
Fig. 6 is a view partly in section on line 6—6 of Fig. 1.

Referring to Figs. 1 and 2, plates 30, 31 and 32 attached to plates 33, 34 and 35 provide the framework of the machine. A bracket 36 attached to plate 35 supports a housing 37 for speed reducing gearing through which a motor 38 drives a shaft 39. Shaft 39 drives a pulley 40 (Fig. 4) connected by a belt 40a with a pulley 41 (Figs. 1 and 2) attached to a shaft 42 journaled in bearings 43, 44 and 45 respectively secured to plates 33, 34 and 35. The base of the housing 37 is attached to bracket 36 by screws 36a (Fig. 4) passing through slots 36b in the bracket. By shifting the housing horizontally, the belt 40a is tightened. Shaft 42 drives a gear 46 meshing with a gear 47 attached to a shaft 48 journaled in bearings 49 and 49a attached respectively to plates 35 and 34. Shaft 48 operates a Geneva gear mechanism comprising a plate 50, a roller 51 attached thereto, and a locking member 52. The roller 51 engages radial slots 53 in a driven member 55 (Fig. 6) having notches 54 which receive the member 52 which locks the member 55 against rotation when not being driven. Member 55 is attached by screws 56 to a hub 57 which is attached to a shaft 58 journaled in bearings 59 and 60 provided by the plates 35 and 33. Screws 61 fasten a rotary conveyor or dial 62 to the plate 55, said screws passing through arcuate slots 63 in order to provide adjustment of the dial 62 relative to the Geneva gear driven member 55. Plate 50 (Fig. 6) provides a cam lobe 50a which engages the roller 50b of switch SW7 to cause it to close for a time when the dial is not being indexed.

Figure 5:
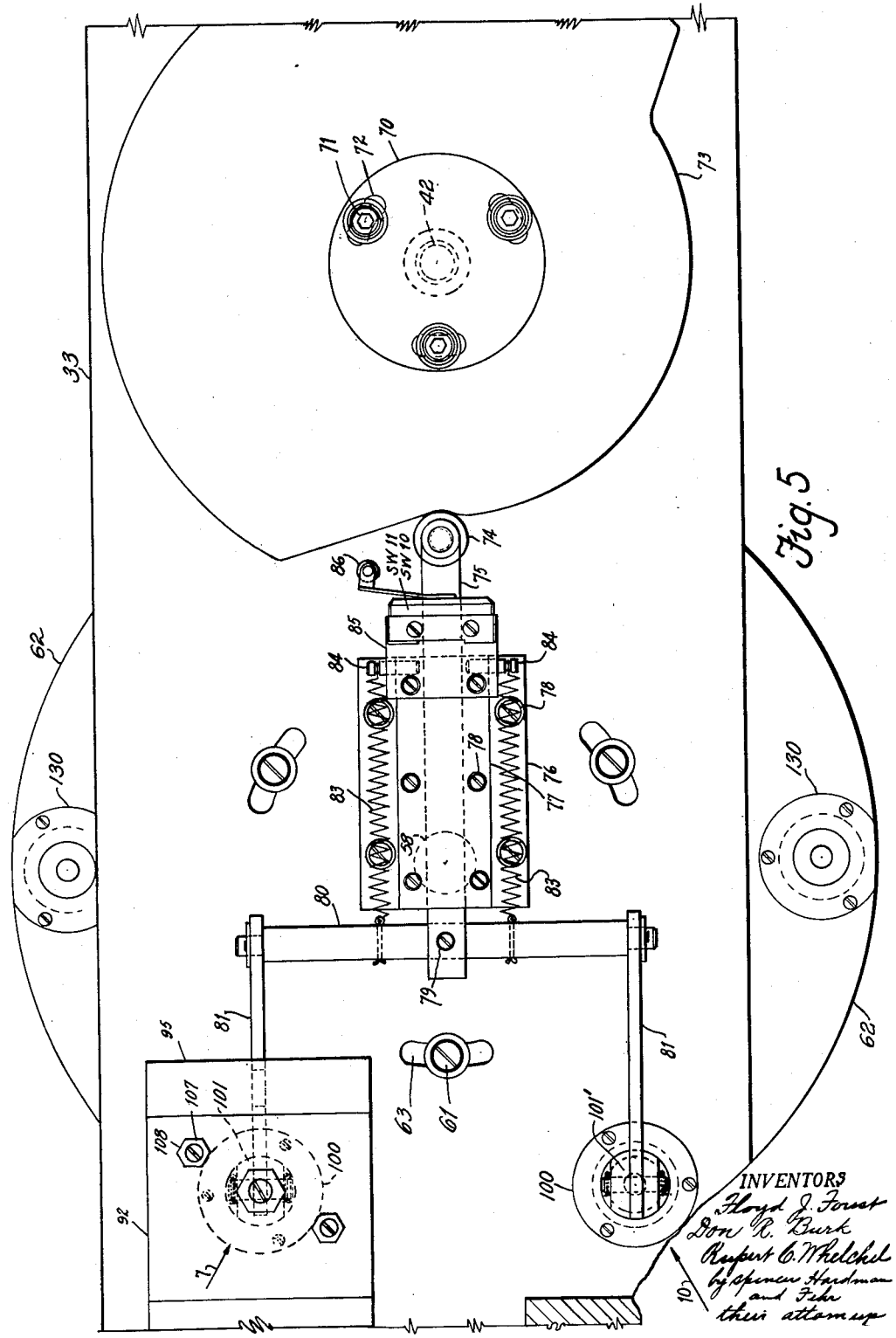
Fig. 5 is a plan view of the machine.

The shaft 42 drives a hub 70 which screws 71 (Fig. 5) passing through arcuate slots 72 in the hub, fasten to a cam 73. Cam 73 engages a roller 74 pivotally supported by a bar 75 which slides in a horizontal groove provided by a bracket 76 and which is retained therein by a cover 77 fastened by screws 78 to the bracket. A screw 79 attaches the bar 75 to a bar 80 which pivotally supports fingers 81, each having an inclined surface 82 as shown in Fig. 1. Springs 83, attached to the bar 80 and to studs 84 fixed to a plate 85 attached to the bracket 76, urge the roller 74 against the cam 73. The plate 85 carries normally closed switches SW10 and SW11 (Fig. 1) whose actuating rollers 86 are engaged by a pin 87 carried by cam 73. Switches SW10 and SW11 are momentarily opened at the end of the tests.

Each finger 81 is engaged by a roller 90 (Fig. 1) supported by a screw 91 passing through a plate 92. The screw 91 receives nuts 93 and 94 by which the screw 91 may be adjusted vertically relative to the plate 92. Since there are two rollers 90, one for each finger 81, there will be two plates 92 (Fig. 2). These plates are attached respectively to the plates 30 and 31 and to plates 95 attached to plate 33 (Fig. 1).

The apparatus at the high pressure test station will now be described with reference to Figs. 7, 8 and 9. A bushing 100 (Fig. 1) guides a vertically movable rod 101 having a notch 102 for receiving one of the fingers 81 which engages not only a roller 90 but also a roller 103 pivotally supported by the rod 101. Rod 101 is integral with a frame or head 104 carrying studs 105 which springs 106 (Fig. 1) connect with screws 107 carried by a plate 92. Screws 107 receive nuts 108 by which the screws are vertically adjusted. By this means the roller 103 is kept in engagement with the finger 81 and the finger 81 in engagement with the roller 90.

The head 104 supports a non-conducting block 110 fixed by screws 111 and supporting tubes 112 through each of which there passes a rod 113 providing a contact 114 for engaging one of the terminals $t$ of a stop light switch S, indicated in dot and dash lines. A spring 115 normally urges the contact down until a nut or collar 116 attached to the upper end of the rod 113, engages the upper end of the tube 112. Screws 118 fasten to the block 110 a non-conducting plate 119 having notches 120 therein. Through one of these notches there projects a terminal post 121 attached to the collar 116 and a screw 122 secures a lead wire 123 to this post. Screws 124 secure to the frame 104 a bracket 125 carrying a switch SW6 whose operating roller 126 engages the collar 116. When contact 114 engages a switch terminal $t$, downward motion of rod 113 and collar 116 ceases. As the head 104 moves down after this engagement, roller 126 rides on collar 116 and causes switch SW6 to close. The parts 104a and 104b of frame 104 are cylindrical and are threadedly engaged by a nut 127 which secures a ring 128 through which the switch S extends, said ring retaining the switch S upon a workholder.

Switch S is supported by one of the six work holders 130 which screws 131 attach to the dial 62. Switch S (Fig. 22) comprises a housing $h$, containing a metal disc $d1$, an insulating disc $d2$ and a metal diaphragm $d3$ which serves as a movable switch contact to engage the ends of terminals $t$, which are supported by insulating block $b$. Each time the dial is indexed, a switch S is placed in alignment with the ring 128 and with a nozzle 132 which a nut 133 secures to a cylinder 134 which receives a plunger 135 carrying a check valve comprising a ball check valve 136 in a cage 137 and retained by an apertured plug 138. The check valve is in communication with a hole 139 in the plunger 135 which is in communication with a pipe tapped opening 140 to which a flexible pipe can be attached to make connection with a source of compressed air. There are passages 141 and 141a communicating respectively with the cylinder bore and with pipe tapped openings 142 and 142a to which devices 210 and 220 (Fig. 3) to be described are respectively attached.

During operation of the machine air pressure is continuously applied to the cylinder 134. When nozzle 132 does not engage a switch S the ball 136 rises against the lower end of plug 138 which has narrow radial grooves 138a (Fig. 8A) through which air can pass to the nozzle. When the nozzle engages a switch S, pressure builds up above the ball; and, when the pressure becomes sufficient, the ball 136 moves away from the plug 138 to allow air to pass directly through the control hole in the plug. The escape of air from the nozzle is not excessive because the time during which the switch S is engaged by the nozzle substantially exceeds the time during which the nozzle is not engaging the switch S. The foregoing applies to the control of air flow from cylinder 134' (Fig. 11) at the low pressure test station.

The plunger 135 slides through packing 145 (retained by a packing gland 146 threaded into the cylinder 134) and passes through a plate 147 supporting threaded rods 148 which pass through brackets 149 and which receive nuts 150 by which the brackets can be adjusted relative to the rods 148. Screws 151 secure the brackets 149 to bars 152 which screws 153 attach to a block 154 welded to cylinder 134. A block 155, welded to cylinder 134, receives a shaft 156 to which eccentrically located screws 157 (Fig. 9) attach the bars 152. Block 155 has a notch 158 rendering accessible a hole 159 in the shaft 156 for receiving a rod by which the shaft can be turned in order to effect movement of the cylinder 134 relative to the bars 152 and plate 147. The shaft 156 is locked in the desired position of adjustment by a set screw 160 threaded through the block 155. In this manner the cylinder 134 can be secured in the desired position of adjustment with respect to the plate 147 which normally rests upon a bushing 165 (Fig. 1) which screws 166 attach to the plate 35. Therefore the distance from the nozzle in its lower position to the switch S can be adjusted. Bushing 165 provides a guide for the vertical movement of the plunger 135. The plunger 135 is pivotally connected at its lower end with a pair of toggle links 170 (Fig. 2) pivotally connected at 171 with a pair of toggle links 172 and a clevis 173 connected with a piston rod 174 of a compressed air servo-motor having a cylinder 175 pivoted at 176 on a bracket 177 attached to a plate 178 supported by the plate 35. Links 172 are connected with a clevis 180 attached to a screw 181 passing through a bar 182 attached to plate 30 and to a plate 183 attached to plate 35. Nuts 184 threaded on the screw 181 provided for vertical adjustment of the latter relative to the plate 182. When the piston rod 174 moves right (Fig. 2), the plunger 135 moves up to cause, through a spring 188, upward movement of the cylinder 134 to cause the nozzle 132 to engage the switch S being tested, while at the same time, the rod 101 has been moved down to cause contact 114 to engage a switch terminal t. When the piston rod 174 moves left the plunger 135 moves down. Before the cylinder 134 moves down the spring 188 is permitted to expand to hold the nozzle 132 against the switch S while the plunger 135 is moving down to cause its shoulder 189 to engage the plate 147. Then the plunger 135 and the plate 147 and the cylinder 134 move down together. Lubricant is fed into the air which is caused to enter the cylinder 134 at 140. Lubricant which escapes from the nozzle 132 will be received by a groove 190 in the nut 133 and will gravitate through a hole 191 and then down around the cylinder 134 into a trough 192 having a discharge pipe 193 connected with a suitable vessel (not shown).

The apparatus in the low pressure station which is shown in Figs. 10, 11 and 12, is constructed like the apparatus described with reference to Figs. 7, 8 and 9 and the parts which are similar are designated by the same numbers with the prime affixed to each number. The differences between the two apparatuses are as follows.

Only one of the contacts 114 of the head 104 at the high pressure test station is connected with a wire, such as 123; but, as to the head 104' at the low pressure test station, both the contacts 114' and 114a' are connected with wires such as 123'. Therefore there are two terminal posts 121' attached respectively to two collars 116' attached to two rods 113' carrying two contacts 114' respectively for engaging both terminals of the switch S as shown in Fig. 10. One of the collars 116' is engaged by a roller 126' of a switch SW5 (Fig. 11). The brackets 149' (Fig. 10) are directly attached to the cylinder 134'. The distance between cylinder 134' and plate 147' is adjusted only by the screws 150' threaded on the rods 149' extending from plate 147'. Referring to Figs. 1 and 2 the plunger 135' is connected by a pin 200 with the rod 201 of a compressed air servo-motor including a cylinder 202 having trunnions 203 (Fig. 1) by which the cylinder is pivotally supported by a bracket 204 attached to a plate 205 attached to plate 31.

The threaded opening 142 of cylinder 134 of Fig. 8 is connected with a pressure gauge 210 (Figs. 16 and 17) the pressure sensitive element 211 of which is engageable with the plunger 212 of a switch SW4 which screws 213 attach to a bracket 214 which screws 215 pivotally attach to the case of the pressure gauge 210. Screws 216 threaded through the bracket can be adjusted to contact the periphery of the gauge in order to adjust the distance of the plunger relative to the center of the gauge.

A pressure relief valve 220 (Fig. 15) is connected with the cylinder 134 by screwing it into a pipe tapped opening 142a (Fig. 7). A low pressure gauge 230 (Fig. 2) is connected by an L 231, valve 232, pipe 233, screwed into a pipe tapped opening 142a' connected by a hole 141a' with the bore of the cylinder 134'. The threaded opening 142' receives a pipe 240 (Figs. 13 and 14) integral with a nut 241 threaded on a cylinder 242 which receives a piston 243 having a rod 244 which a screw 245 attaches to a collar 246 fixed to a plate 247 carrying set screws 248, 249 and 250 threaded through the plate 247 and retained in the desired position of adjustment by lock nuts 251. The screws 248, 249 and 250 are in alignment respectively with the plungers 258, 259 and 260 of switches SW1, SW2 and SW3 which are mounted on a plate 252 attached to rods 253 which are supported by brackets 254 attached to the cylinder 242. The screws are adjusted to different distances from the switch plungers so that the switches are operated in succession depending on the extent of movement to the left of the piston 243 against the action of a spring 261 which is retained by a nut 262 threadedly engaging the left end of the cylinder 242. As the pressure fluid applied through the nozzle 132' (Fig. 11) increases, the switches S1, S2 and S3 will be successively closed and the number of switches which will close is determined by the extent of rise of pressure. In a manner to be described, these switches control lamps which indicate whether or not the pressure has reached certain values.

The dial 62 (Fig. 6) carries six cam plates 270 each for engaging the roller 271 (Fig. 18) of a switch SW12 supported by bracket 272 supported by plate 33.

In case the switch leaks under test at the high pressure test station, it is ejected from the workholder before it arrives at the low pressure test station by means shown in Figs. 19, 20 and 21. The leaking of the switch S under test is detected by gauge 210 (Fig. 16). If the switch does not retain a predetermined pressure, the normally open switch SW4 does not close. By means to be described, during the indexing of the dial a solenoid SO13 (Fig. 19) is caused to be energized if switch S4 is open. When solenoid S13 is energized, it effects the opening of a valve 281 supported by a plate 282 attached to a plate 283 attached to plate 30 (Fig. 19). Compressed air is admitted to a pipe 284 which blows the switch S upwardly from the workholder 130 and causes it to strike against a hood 285 and then descend through a chute 286 extending into a pipe 287 and into a bin 288 closed by a cover 289 which supports the pipe 287. The chute 286 is supported by a bracket 290 which screws 291 attach to plate 30. Pipe 284 is supported near its upper end by being clamped between two blocks 292 and 293 secured by screws 294. Screws 295 fix the block 292 to a plate 296 which screws 297 fix to the plate 30.

Referring to Fig. 23, 110 v. A. C. wires 300, 301 are connected through junctions 1 and 2 with primaries 303 and 304 of transformers T1 and T2. Secondary 305 through rectifier tube V1 (model 5U4-G) and voltage regulator tubes V2, V3, V4 and V5 (each model OD3) supply, through junction 3, switch SW10 and junction 4, voltage to the plates of Thyratrons I, II, III and IV (each model 2050). Secondary 306 supplies cathode heater current for tube VI. Secondary 307 provides cathode heater current at x, x for the Thyratrons. Choke T5 and condenser C1 provide a filter to divert ripples to ground.

Transformer T2 with selenium rectifier SR1 provides normal negative grid bias for the Thyratrons. The bias is slightly more negative than required to prevent the Thyratrons from conducting.

Condenser C2 grounds ripples from Thyratron grid bias. Condenser C3 grounds ripples from Thyratron plate supply.

Switches SW1, SW2, SW3 (Figs. 2, 13 and 23) which normally engage contacts C, move to contacts O when the pressure on the diaphragm of the switch under test at station 2 (low pressures test) reaches 45 lbs., 100 lbs., 125 lbs., respectively.

Switch SW4 on gauge 210 (Figs. 16–17) is normally open, and it closes when the gauge shows 2500 lbs. or greater.

Switch SW5 on the low pressure head (Fig. 11) is normally open; and it closes when the head comes down to engage the switch under test and to make contact with its terminals.

Switch SW6 on the high pressure head (Fig. 8) is normally open; and it closes when the head comes down to engage the switch under test and to make contact with one of its terminals.

Switch SW7 is a normally open switch which is closed at the end of indexing and is allowed to open during indexing.

Solenoid SO8 when energized causes an air valve to open to admit compressed air to the lower end of cylinder 202 (Fig. 2) which causes nozzle 132' (Fig. 12) to engage the switch under test.

Solenoid SO9 when energized causes an air valve to open to admit compressed air to the left end of cylinder 175 (Fig. 2) which causes nozzle 132 to engage the switch under test. Solenoid SO9 (Fig. 3) is supported by a bracket 500 attached to the servo cylinder 175. Solenoid SO9 has an armature 501 (movable right when the solenoid is energized) connected by pin 502 and link 503 with a lever 504 pivoted at 505 on a bracket 506 carried by the member 507 extending from the left head of cylinder 175. Member 507 contains a valve having an operating rod 508 engageable by the lever 504. When armature 501 moves right compressed air flows from hose 509 through the open valve and into the left end of cylinder 175. The control of air flow into the bottom of cylinder 202 of the low pressure testing apparatus by solenoid SO8 is identical with that described with respect to the control of air flow into the left end of cylinder 175. In Fig. 1 the parts actuated by solenoid SO8 are marked with the members applied to corresponding parts operated by solenoid SO9 (Fig. 2) with primes affixed. When the solenoids SO8 and SO9 are deenergized, the valves are returned by springs to normal status in which flow from the compressed air source to the servo cylinders is blocked and these cylinders are vented so that springs therein return the servo rods 201 and 174 respectively to normal position and cause the nozzle 132' and 132, respectively to move down.

Switches SW10 and SW11 are normally closed and are opened momentarily just before the end of the cycle after tests are completed and before indexing starts.

Switch SW12, operated by cam plates 270 carried by the dial 62 (Fig. 16), is normally closed. It opens when an index is about half completed.

Solenoid SO13 when energized opens valve 281 (Fig. 17) to cause compressed air to flow from pipe 284 to eject, during indexing, from station 1 to station 2, a switch which does not test 2500 lbs. or greater.

Relay RE1 has a coil 310 and normally closed contacts 311 and 312.

Relay RE2 has a coil 320 and normally closed contacts 321 and 322. Wire 313 connects contacts 312 and 321.

Relay RE3 has a coil 330 and normally closed contacts 331 and 332 connected by wire 333 with junction 14.

Relay RE4 has a coil 340 and normally open contacts 341 and 342.

Relay RE5 has a coil 350 and normally open contacts 351 and 352 and normally closed contacts 354 and 355. Wire 343 connects 342 and 352. Wire 353 connects contacts 341, 351 and 354 with wire 365 connected with wire 301.

Relay RE6 has a coil 360 and normally open contacts 361 and 362, and normally open contacts 363 and 364. Wire 365 is connected to 362 and 364. Wire 366 connects wire 302 with coil 340 and solenoid S13 connected through switch S12 with wire 356 connected with contact 354.

Relay RE7 has a coil 370 connected with the secondary of transfer T4 and with a contact of the switch under test. Relay RE7 has normally open contacts 371 and 372. Contact 371 is connected with wire 365. Contact 372 is connected by wire 373 with coil 360 and contact 361.

Switches SW6 and SW7 connect wires 381 and 382 respectively (connected with wires 301 and 302 respectively) with wires 383 and 384 respectively connected with the ends of solenoid SO9 and with the primary of transformer T4. Switch SW5 connects wire 381 with solenoid S8 connected with wire 384. At the end of indexing, switch SW7 is closed, and, when the switch under test is engaged by the high pressure head at station #1, switch SW6 closes and solenoid SO9 is energized and the cylinder 134 is raised and pressure oil above 2,000 p. s. i. is applied. If there is no ground in the switch S and the switch S passes the 2,500 p. s. i. leak test, solenoid SO13 is not energized. If there is a ground, relay RE7 closes 371, 372 contacts and coil 360 of RE6 receives current through switch S11, wire 373, contacts 371, 372, wire 365 and contacts 361, 362 and contacts 363, 364 close. Therefore, at about halfway during the following index when SW12 closes, solenoid SO13 will be energized and the defective switch will be blown out from its workholder on the dial.

If the switch S passes the ground test but did not pass the high pressure leak test, switch SW4 would remain open and relays RE4 and RE5 would not operate and solenoid SO13 would receive current when switch SW12 closes through wire 366 and wire 356, contacts 355, 354 and wires 353 and 365. The switch S would be blown out at about half-way of the following index.

If the switch S passes the high pressure leak test switch SW4 closes and relays RE4 and RE5 both operate and the circuit of solenoid SO13 is interrupted during indexing at 354 separated from 355.

During indexing, switch SW7 opens to deenergize the solenoids SO8 and SO9. During the latter part of indexing switch SW12 opens to deenergizable solenoid SO13. After the high pressure test, switch SW4 will open if it had been closed and coil 340 of relay RE4 will be deenergized. Near the end of the cycle of operation, switch SW11 opens momentarily to disconnect wire 302 from relay coil 360 and relay coil 350 so that relays RE6 and RE5 return to normal status. If relay RE7 had been energized, it returns to normal status when the high pressure test head rises to disconnect coil 370 from a grounded contact of the switch.

At the high pressure test station, it is immaterial which terminal of the switch S is engaged by contact 114 (Figs. 5, 6) since the test is to determine whether the switch diaphragm $d_3$ (Fig. 22) which under air pressure bridges the terminals, is grounded on the metal switch case. Under the high pressure test, the diaphragm is stressed not only to make contact with adjacent switch contacts but also to stress the peripheral insulation which should withstand the pressure. If it does not, the diaphragm may be grounded. A ground might not show up under normal operating pressure. But under abnormal operating pressure, a ground might occur which would give trouble in service. Hence the high pressure test is under a pressure which would exceed any abnormal pressure which might be encountered later when the switch S is used in a hydraulic brake system.

If the switch S passes the leak test and the ground test at the first station, it passes to the second station where it is subjected to air pressure to determine in what range of pressure the diaphragm of the switch bridges its contacts.

After the switch S arrives at the second station, the head 101' descends and both terminals of the switch are connected into the test circuit. Switch SW5 closes, solenoid SO8 is energized, cylinder 134' rises and the nozzle 132' is applied to the switch. If the switch diaphragm bridges the contacts of the switch before the pressure builds up to 45 p. s. i. only the yellow lamp L1 will burn. If the switch closing pressure is above 45 p. s. i. and under 100 p. s. i., only the green lamp L2 will burn. If the switch closing pressure is about 100 p. s. i. and under 125 p. s. i., only blue lamp L3 will burn. If the switch closing pressure is above 125 p. s. i., only the white lamp L4 will burn. These lamps indicate the classification of switches S according to contact closing pressure range.

If the switch closing pressure is under 45 p. s. i., switch SW1 remains closed at the time the switch under test is closed. At that time R10 of tube I is shorted out by the following circuit: lower end of R6, wire 400, SW1, 401 switch under test closed, 402 and contacts of relays RE3, RE2, RE1 to ground. Negative grid bias is reduced and tube I conducts current to lamp L1 and coil 310 of relay RE1. Contacts 311 and 312 separate and no other Thyratron will conduct although other switches SW2, SW3 may be closed after the switch under test closes contact.

If the switch closing pressure is over 45 p. s. i. and under 100 p. s. i., switch SW1 will be at O and switch SW2 will be at C. Nothing happened when SW1 moved to O because the switch S under test had not yet been closed. Tube I does not become conducting when the switch S closed because switch SW1 is not at C but is at O. Tube II becomes conducting because its negative grid bias is reduced since R11 of II is shorted by the following circuit: lower end of R7, wire 403, switch SW2 at C, switch SW1 at O, wire 401, switch S, wire 402, contacts of relays RE3, RE2, RE1 to ground. Tube II passes current to green lamp L2 and to coil 320 of RE2 which prevents tubes III and IV from becoming conducting although the pressure rises above 125 p. s. i. after tested switch S closes.

If the switch closing pressure is above 100 p. s. i. and under 125 p. s. i. when tested switch S closes, tubes I and II cannot conduct because switches SW1 and SW2 are at —O— while switch SW3 is at —C—. Resistance R12 of tube III is shorted by the following circuit: lower end of R8, wire 404, switch SW3 at C, switch SW2 at O, switch SW1 at O, wire 401, tested switch S, wire 402, contacts of relays RE3, RE2, RE1 to ground. Negative grid bias is reduced on tube III which passes current to blue lamp L3 and to coil 330 of relay RE3. This prevents tube IV from conducting although pressure may rise above 125 p. s. i. after tested switch S closed.

If the switch closing pressure is above 125 p. s. i., switches SW1, SW2, SW3 are all at —O—, and R13 of tube IV is shorted by the following circuit: lower end of R9, wire 404, switches SW1, SW2, SW3 at —O—, wire 401, tested switch S, wire 402, contacts of relays RE3, RE2, RE1 to ground. Tube IV passes current to white lamp L4. No other Thyratron can pass current because none of the switches SW1, SW2, SW3 are at —C—.

After the test at station 2, the head 104 is raised and the cylinder 134 is lowered and indexing to the loading station takes place, switch SW10 opens momentarily to render non-conducting any Thyratron which had become conducting and all coils of relays RE1, RE2, RE3 and all of the lamps are deenergized if they had been energized during the test.

It is apparent from the foregoing description that the hydraulically operated switch is tested first at a high pressure and ground test station where it is tested for leaks of operated pressure fluid and for a grounded diaphragm. If it fails to pass either test, it is ejected from its workholder moved by a conveyor dial. If the switch passes the leak test and the ground test, it passes to a second station where by the burning of one only of a series of lamps of different colors, the contact closing pressure range of the switch is indicated. For example:

| Contact Closing Pressure | Color of Lamp |
| --- | --- |
| less than 45 p. s. i. | yellow. |
| from 45 p. s. i. to less than 100 p. s. i. | green. |
| from 100 p. s. i. to less than 125 p. s. i. | blue. |
| 125 p. s. i. and greater | white. |

After the test at the second station the dial moves the switch to a loading station where the operator removes it and places it in the proper bin chute which one of the lamps had indicated. Although the lamp goes out before indexing the dial, it is easy for the operator to remember which lamp had been burning. Before the next test at the second station can result in the burning of a lamp, there is a lapse of time during which the head 104' comes down to make contact with the switch S to be tested and to close switch SW5 (if a switch in the workholder under the head) and to cause the solenoid SO8 to be energized and to cause the cylinder 134' to rise and air pressure to be built up against the diaphragm of switch S and to cause the switch diaphragm to engage the switch contacts and the pressure at which contact is made to be indicated by the closing of none of, or by the closing of one or more of switches SW1, SW2, SW3. Before the switch S is closed, no lamp burns. By the time a lamp burns again the operator will have removed the switch S previously tested.

While the embodiment of the present invention as herein disclosed, constitutes a preferred form, it is to be understood that other forms might be adopted, all coming within the scope of the claims which follow.

What is claimed is as follows:

1. A machine for testing switches having fixed contacts and a movable contact actuated into engagement with the fixed contacts by fluid pressure and having a pressure fluid chamber with a pressure fluid inlet and having terminals extending from a side thereof, said machine comprising a rotatable dial, a plurality of workholders carried thereby each adapted to receive a switch to be tested, means for indexing the dial from a loading station to a high pressure test station and to a low pressure test station, similar apparatus at each test station, each apparatus comprising a head adjacent the terminal side of the switch to be tested and movable into and out of engagement with the switch, means carried by the head for making an electrical connection with the switch when the head is advanced thereto, a member movable toward and away from the opposite side of the switch for making connection therewith for flow of pressure fluid into the pressure chamber of the switch, means for moving the head while the dial is stationary, a mechanism for operating the dial indexing means and the head moving means in recurrent sequence, means responsive to movement of the head to engage the switch for causing the member to make fluid connection with the switch and, means responsive to the establishment of said fluid connection for causing fluid to flow under pressure into the pressure chamber of the switch, an electrical device having terminals connected by the head at the high pressure test station with the tested switch terminals and having means for detecting leakage of the tested switch when subjected to high pressure, and an electrical device having terminals connected by the head at the low pressure test station with the tested switch terminals having means for determining in which one of a plurality of pressure ranges the contacts of the tested switch close.

2. A machine for testing switches having fixed contacts and a movable contact actuated into engagement with the fixed contacts by pressure and having a fluid pressure fluid chamber with a pressure fluid inlet and having terminals extending from a side thereof, said machine comprising a rotatable dial, a plurality of workholders carried thereby each adapted to receive a switch to be tested, means for indexing the dial from a loading station to a high pressure test station and to a low pressure test station, similar apparatus at each test station, each apparatus comprising a head adjacent the terminal side of the switch to be tested and movable into and out of engagement with the switch, means carried by the head for making electrical connections with the fixed contacts of the switch when the head is advanced thereto, a cylinder movable toward and away from the opposite side of the switch, a nozzle carried thereby for making fluid connection with the pressure fluid inlet of the switch, a piston in the cylinder and having connection with a fluid pressure source and a duct in the piston leading from said connection into the cylinder and including a passage through a notched valve seat, a check valve urged against said seat by fluid pressure from said connection whereby escape of pressure fluid from the nozzle is restricted when the latter is not engaging the switch, means for moving the piston toward the switch, a spring for transmitting movement from the piston to the cylinder to initially press the nozzle against the switch whereby, as pressure builds up initially in the switch, the check valve is forced from its seat and the duct in the piston is unblocked and increased pressure is applied to the switch while the nozzle is being urged by increased fluid pressure against the switch due to pressure increase in the cylinder, means for moving the head while the dial is stationary, a mechanism for operating the dial indexing means and the head moving means in recurrent sequence, means responsive to movement of the head to engage the switch for causing the piston to move toward the switch, an electrical device having terminals connected by the head at the high pressure test station with the tested switch terminals and having means for detecting leakage of the tested switch when subjected to high pressure, and an electrical device having terminals connected by the head at the low pressure test station with the tested switch terminals having means for determining in which one of a plurality of pressure ranges the contacts of the tested switch close.

3. A machine for testing switches having fixed contacts and a movable contact actuated into engagement with the fixed contacts by fluid pressure and having a pressure fluid chamber with a pressure fluid inlet, said machine comprising a rotatable dial, a plurality of workholders carried thereby each adapted to receive a switch to be tested, means for indexing the dial from a loading station to a test station, means at the test station for applying pressure fluid to the switch, means at the test station for making an electrical connection with a switch fixed contact, means capable of ejecting the switch as it moves from the test station, a solenoid for controlling operation of the ejecting means, a current source, a circuit for connecting the solenoid with the source including a switch closed during indexing and, in parallel, a normally closed switch and a normally open switch, a second circuit including a current source, a magnet coil and the connection to a fixed contact of the switch being tested, said magnet coil being energized if the movable contact of the tested switch is grounded, means responsive to energization of the magnet coil for closing the normally open switch in the first circuit, a third circuit including a second magnet coil and a switch for connecting it with the current source first mentioned, means responsive to attainment of a certain fluid pressure in the tested switch for closing the switch in the third circuit to energize the second magnet coil, and means responsive to energization of the second magnet coil for opening the normally closed switch in the first circuit.

4. A machine for testing switches having fixed contacts and a movable contact actuated into engagement with the fixed contacts by fluid pressure and having a pressure fluid chamber with a pressure fluid inlet, said machine comprising a workholder for receiving the switch, means for applying fluid pressure to the switch to cause the movable contact to engage the fixed contacts, a current source, a plurality of indicators, a plurality of devices respectively for connecting the indicators with the source, a two-way switch having a normal or first circuit making position and a second circuit making position, means responsive to the attainment of a certain pressure applied to the tested switch for causing the two-way switch to move to second position, a first control circuit completed by closure of the tested switch while the two-way switch is in first position, means rendered operative by completion of the first control circuit for rendering operative the device of the first indicator, means responsive to operation of the first device for preventing operation of the second device when the two-way switch moves to second position and a second control circuit completed by closure of the tested switch while the two-way switch is in second position for rendering operative the device of the second indicator.

5. A machine for testing switches having fixed contacts and a movable contact actuated into engagement with the fixed contacts by fluid pressure and having a pressure fluid chamber with a pressure fluid inlet, said machine comprising a workholder for receiving the switch, means for applying fluid pressure to the switch to cause the movable contact to engage the fixed contacts, a current source, a plurality of indicators, a plurality of Thyratrons respectively for connecting the indicators with the source, and each having a grid normally negatively biased sufficiently to prevent conduction by the Thyratron, a two-way switch having a normal or first circuit making position and a second circuit making position, means responsive to the attainment of a certain pressure applied to the tested switch for causing the two-way switch to move to second position, a first control circuit completed by closure of the tested switch while the two-way switch is in first position for decreasing the negative bias of the first Thyratron grid whereby the first Thyratron becomes conducting, a relay rendered operative when the first Thyratron is conducting for preventing operation of the second Thyratron when the two-way switch moves to second position, and a second control circuit completed by closure of the tested switch when the two-way switch is in second position for decreasing the negative bias of the second Thyratron to render it conducting.

6. A machine for testing switches having fixed contacts and a movable contact actuated into engagement with the fixed contacts by fluid pressure and having a pressure fluid chamber with a pressure fluid inlet, said machine comprising a workholder for receiving the switch, means for applying fluid pressure to the switch to cause the movable contact to engage the fixed contacts, a current source, first, second, third and fourth indicators, first, second, third and fourth Thyratrons respectively operable to connect the indicators with the source, each Thyratron having a grid normally negatively biased to such extent that the Thyratron is non-conducting, resistances each connected with a grid and with ground or zero potential, a circuit to ground from one of the fixed contacts of the tested switch and including three sets of normally closed relay contacts in series and opened by energization respectively of magnet coils of first, second and third relays, said coils being connected respectively in parallel with said first, second and third indicators, first, second and third two-way switches each having first or normal positions engaging a first contact and second positions engaging a second contact, means for causing the first switch to move to second position upon attainment of a certain lower pressure of fluid applied to the tested switch, for causing the second switch to move to second position upon attainment of a certain intermediate pressure, and for causing the third switch to move to second position upon attainment of a certain higher pressure, connections from the first contacts of said first, second and third switches, respectively, to the non-grounded ends of the grounded resistances with which the grids of the first, second and third Thyratrons are respectively connected, a connection from the other fixed contact of the tested switch to the first switch, a connection from the second contact of the first switch to the second switch, a connection from the second contact of the second switch to the third switch and a connection from the second contact of the third switch to the non-grounded end of the grounded resistance connected with the grid of the fourth Thyratron.

7. A machine for testing switches having fixed contacts and a movable contact actuated into engagement with the fixed contacts by fluid pressure and having a pressure fluid chamber with a pressure fluid inlet, said machine comprising apparatus for connecting said inlet with a pressure fluid source, a fluid pressure servo connected by the apparatus with the switch chamber and having a displaceable member which is moved in accordance with pressure in the switch chamber, a plurality of two-way switches having first or normal positions and actuated by said member successively into their respective second positions as pressure increases, a plurality of electrically operated indicators respectively for indicating lowest to highest pressure ranges when the tested switch closes, the number of said indicators exceeding by one the number of two-way switches, a current source, a plurality of Thyratrons respectively for connecting the indicators with the current source, a plurality of relays equal in number to the number of two-way switches and each having a magnet coil and normally closed contacts which are opened when the magnet coil is energized, said magnet coils being in parallel with those indicators which are used respectively to indicate pressure ranges lower than the highest, grid bias controlling resistance net-works associated with the Thyratrons and each normally grid-biasing the associated Thyratron for non-conduction, a first short circuit for a portion of the net-work associated with that Thyratron which, when conductive, passes current to the indicator of the lowest range of pressure in which the test switch contacts close, said first short circuit including, in series, all of the normally closed contacts of the relays, the closed contacts of the tested switch and the contacts, in normal or first position of that two-way switch which would have been actuated had the test switch closing pressure been higher than the lowest pressure range, said first short-circuit causing such change in bias of said first specifically mentioned Thyratron that it passes current to the indicator of lowest pressure range, a second short circuit for a resistance of the net work associated with a second Thyratron which when conducting, passes current to the indicator of an intermediate pressure range, said second short circuit including in series all of the normally closed contacts of the relays, the closed contacts of the tested switch and the contacts in second position, of that two-way switch first to be operated by the fluid pressure actuated member and the contacts, in first or normal position, of that two-way switch second to be operated by said members if the tested switch closing pressure had been higher than the intermediate pressure range, said second short circuit causing such change in the bias of said second Thyratron as to cause it to pass current to the indicator of the intermediate pressure range, a short circuit for a resistance of the net work associated with the Thyratron which, when conductive, passes current to the indicator of highest pressure range, said last mentioned short circuit including in series all of the normally closed contacts of the relays, the closed contacts of the tested switch and all of the two-way switches in their second positions, said last mentioned short circuit causing such change in the bias of the last mentioned Thyratron as to cause it to pass current to the indicator of the highest pressure range, the operation of the indicator of the pressure range, other than the highest, within which the tested switch closes being accompanied by energization of the relay magnet coil in parallel with that indicator, whereby the contacts of that relay open and no other resistance short circuit can be completed although the pressure upon the displaceable member should increase after the tested switch contacts close, in consequence of which no Thyratron can become conductive other than the one which had passed current to the indicator of the pressure range within which the tested switch closes.

8. A machine for testing switches having a case providing a pressure fluid chamber and a pressure fluid inlet, fixed contacts, terminals connected therewith and a movable contact actuated into engagement with the fixed contacts by fluid pressure, said machine comprising a work holder for receiving the switch with its terminals extending from one side of the holder and its pressure inlet extending from the other side of the holder, a head movable against the switch case to retain it upon the holder, contacts movably supported by the head for engagement with switch terminals upon movement of the head a distance less than that through which the head moves to engage the switch case, springs transmitting force from the head to the head contacts, a controller actuated in response to motion of the head relative to the head contacts when a switch to be tested is present upon the holder, a device for connecting the switch chamber with a fluid pressure source and having a nozzle for making connection with the pressure fluid inlet of the switch and means under control by said controller when actuated for causing the device to move to apply its nozzle to said pressure inlet of the switch.

FLOYD J. FOUST.
DON RANDALL BURK.
RUPERT C. WHELCHEL.

REFERENCES CITED

The following references are of record in the file of this patent:

UNITED STATES PATENTS

| Number | Name | Date |
|---|---|---|
| 1,815,837 | Deisch | July 21, 1931 |
| 1,905,668 | J. W. White | Apr. 25, 1933 |
| 1,971,426 | Poole | Aug. 28, 1934 |
| 2,026,079 | D. A. White et al. | Dec. 31, 1935 |
| 2,490,821 | Leonard | Dec. 13, 1949 |